Jan. 18, 1944.  G. K. NEWELL  2,339,421
PILOT MECHANISM
Filed Sept. 30, 1941
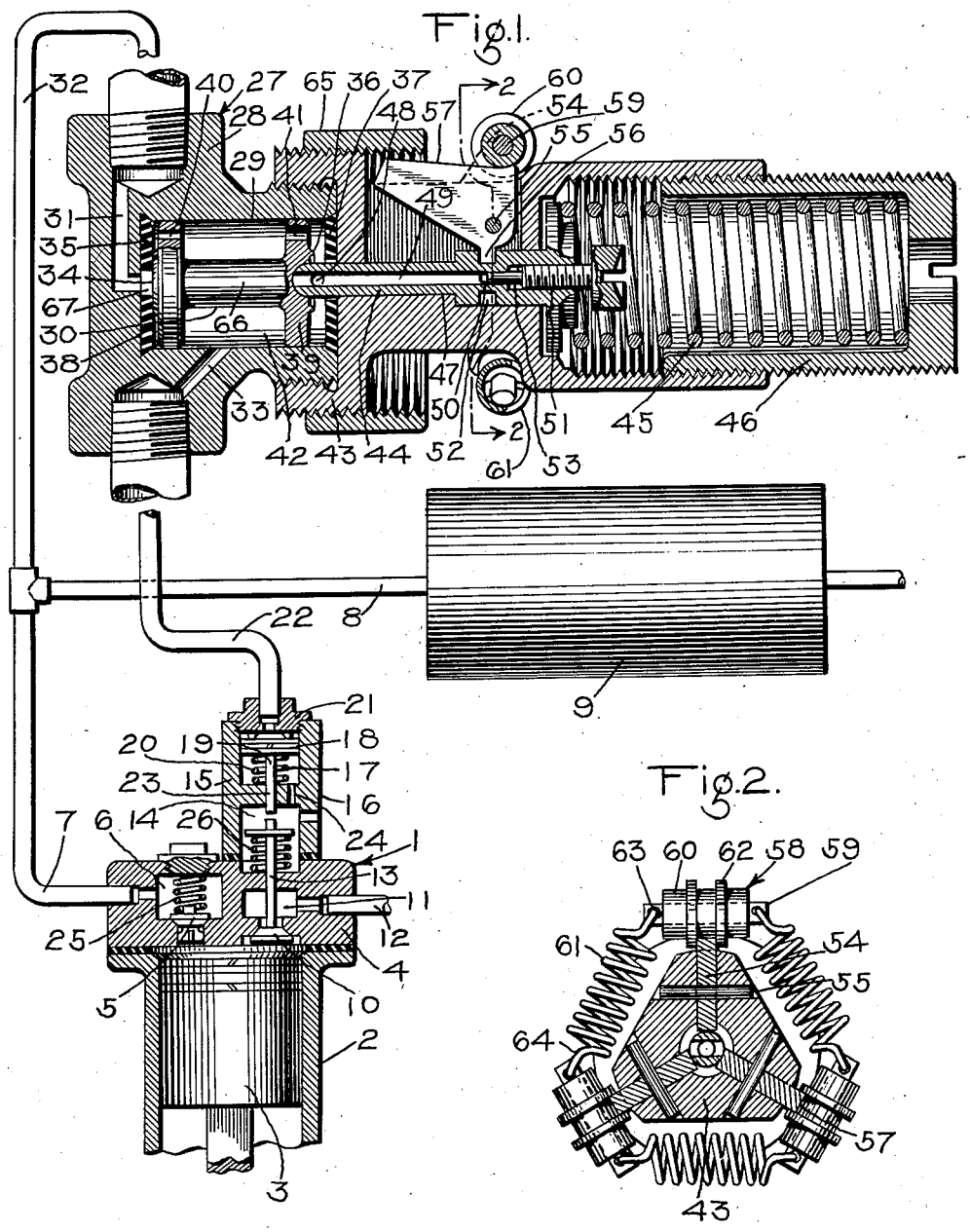
INVENTOR
GEORGE K. NEWELL
BY
ATTORNEY Patented Jan. 18, 1944

2,339,421

UNITED STATES PATENT OFFICE 2,339,421

PILOT MECHANISM

George K. Newell, near Pitcairn, Pa., assignor to The Westinghouse Air Brake Company, Wilmerding, Pa., a corporation of Pennsylvania Application September 30, 1941, Serial No. 412,966

7 Claims. (Cl. 74—100)

This invention relates to control devices and more particularly to a device operated by fluid pressure for controlling the movement of a valve, a switch or the like.

One object of my invention is to provide a fluid pressure responsive control device for effecting sudden or "snap" movement of a valve, switch or other pressure controlled device from one position to another according to the pressure acting on said fluid operated control device.

Other objects and advantages will appear in the following description and claims.

In the accompanying drawing, Fig. 1 is a diagrammatic sectional view of my improved control device incorporated in a fluid compressor control system, Fig. 2 is a view taken along line 2—2 of Fig. 1.

In the drawing, the control device embodying the invention is indicated by the reference character 27, for said illustrative purposes only, is shown associated with a compressor 1 which operates continuously, as distinguished from the type in which the operation of the compressor is interrupted when the pressure of the fluid compressed reaches a predetermined value and is resumed when the pressure becomes reduced to a predetermined degree below such value. The compressor 1 is shown as comprising a cylinder 2 in which a fluid compressing piston 3 is mounted and reciprocated in the usual manner.

The upper end of the cylinder 2 is closed by a cylinder head 4 which is provided with an outlet valve 5 for controlling the flow of fluid under pressure from the cylinder 2 to an outlet chamber 6 which communicates through pipes 7 and 8 with a fluid pressure reservoir 9. The outlet valve 5 is normally maintained in closed position by a spring 25. The cylinder head 4 is also provided with an inlet valve 10 for controlling the flow of fluid to the cylinder 2 by way of chamber 11 and pipe 12 which are in constant open communication with atmosphere. This inlet valve is normally maintained in closed position by a spring 26. The stem 13 of the inlet valve 10 extends through the cylinder head 4 into chamber 14 formed in the body 15 of an unloading device 16 mounted on said head over said inlet valve.

The body of the unloading device 16 is provided with a chamber 14, a cylinder 17 and an unloading piston 18, which piston is operatively mounted in the cylinder 17. The cylinder 17 is closed at its upper end by a cap nut 21° and at its lower end by the wall 24 formed in the body 15. The piston 18 is provided with a stem 19 which extends downwardly through a bore 23 in the wall 24 in a chamber 14 which is open to atmosphere. This stem, as will hereinafter be described is adapted to operatively engage the end of the stem 13 of the inlet valve 10 but is normally held out of such engagement by a spring 29.

The control device 27, as illustrated in Fig. 1, may be employed for the purpose of piloting the action of the unloading mechanism 16 of the compressor 1, and may comprise a casing 28 having operatively mounted therein a piston element 30 comprising spaced piston heads 38 and 39 rigidly connected together by a stem 66.

At the left hand side of piston 30 is a chamber 67 which is adapted to be connected to a passage 31 leading from a pipe 32 connected with pipes 7 and 8. Between the piston heads 38 and 39 there is a chamber 42 which is constantly connected through an exhaust passage 33 and a pipe 22 to the chamber at the face side of unloading piston 18. The piston head 38 has formed thereon an annular valve rib 34 which normally makes a sealing engagement with a valve seat 35 over the inlet passage 31. The piston head 39 is provided with an annular valve rib 36 which operates upon the valve seat 37 at the opposite end of the cylinder. A discharge passage 33 is connected to the chamber 42 intermediate the piston heads 38 and 39. Piston heads 38 and 39 are also provided with restricted apertures 40 and 41, respectively, which apertures connect the intermediate chamber 42 to the faces of the pistons.

The valve seat 37 is secured in place by a casing member 43 which screws upon the casing member 28. This member 43 forms the main carrying means for the snap action and range regulating portion of the device.

The piston element 30 is operatively associated with a strut member 44 which is carried in a bore 47 of the casing member 43 and which is interposed between the piston head 39 and a regulating compression spring 45 which is held in abutting engagement with the strut member by a nut 46, forming a part of the casing of the device. This nut has screw-threaded connection with the casing member 43 and, when rotated either in a clockwise or counter-clockwise direction, varies the power of the regulating spring for determining the cut in and cut out operating point of the device as will more fully appear hereinafter.

The strut member 44 is provided at one end with a transverse bore 48 and at the opposite end is provided with another transverse bore 50, the latter bore communicating with an annular atmospheric groove 52 in the member. These transverse bores are connected by an axial bore 49 in the member. Screwed into the bore 49 at the right hand end of the strut is a regulating member 51 having at its inner end a metering pin 53 which is movable in the bore 49 and across the bore 50 to regulate the rate of flow of fluid through the bore 50. This flow control provides a means for regulating the pneumatic snap action of the device.

The casing member 43 has one or more, preferably three, lever members in the approximate form of a T rockably attached thereto preferably by means of pins 55. Each of these lever members is provided at one side of the pin 55 with a lever arm 56 which projects into the groove 52 in the strut member 44, and at the other side of the pin is provided with longitudinally extending arms having an outer edge surface 57 which is preferably slightly concave in contour. Operatively mounted on these surfaces is a spring assembly 58 which as will be described later, is operative to exert an actuating pressure on the levers.

The spring assembly 58 preferably comprises three rollers 60 in the form of sheaves, three axles 59 upon which the rollers 60 are rotatably mounted and three springs 61. Each roller 60 is constructed to roll along the surface 57 of its respective lever member 54 and is guided along the surface by flanges 62 provided on the roller. The axles 59 are interconnected by means of tension springs 61, the springs being provided with hooked ends 64 which are anchored in eyes 63 provided in the ends of the axles at point just beyond the ends of the rollers.

It should be mentioned that the spring assembly 58 and lever members 54 are especially adapted to operate to assist the pneumatic means in effecting the snap action of the apparatus, as will hereinafter more fully appear in the description of the operation.

A range regulating or stop ring 65 screws on the casing member 43, which ring member, in the present embodiment of the invention, encompasses a portion of each of the snap acting lever members 54, and which serves as a stop for limiting the travel of the rollers 60 along the surfaces 57 of the lever members 54. This ring constitutes adjustable means for regulating the extent of snap action effected by the spring assembly 58 and cooperating lever members 54 and for determining the range between reservoir pressures for effecting the loading and unloading the compressor.

In operation, assuming the several parts of the device to be in the positions in which they are shown in Fig. 1. the compressor will force fluid past the outlet valve 5. and through outlet fluid valve chamber 6, and pipes 7 and 8 into a fluid pressure reservoir 9 and into chamber 67 of the control device by way of pipe 32. Fluid in chamber 67 acts over only that portion of the face of the piston head 38 which is circumscribed by the valve ring 34. When the pressure of the fluid in the reservoir 9 has been increased on this small portion of the face of the piston head 38 sufficiently to overcome the opposing pressure of the compression spring 45 and of the spring assembly 58 acting through the lever members 43 and rollers 60, the valve 34 will be moved away from the valve seat 35. The full area of the piston head 38 is now exposed to reservoir pressure, the resulting increase in effective force causing an acceleration of the piston in its movement, in this direction.

At the same time, reservoir fluid passes through the restricted aperture 40 in the piston head to the chamber 42 intermediate the piston heads 38 and 39, thence, by way of a pipe 22 to the cylinder 17 in the unloading device 16. Fluid under pressure acting on the unloading piston 18 forces the piston downwardly compressing spring 17, the stem 19 of said piston engaging the stem 13 of the inlet valve 10. Further movement of the piston 18 unseats the inlet valve 10, allowing the fluid, which would normally be compressed in cylinder 2 and discharged past the outlet valve 5, to flow back to atmosphere by way of a chamber 11 and a pipe 12, thus unloading the compressor.

Fluid under pressure also passes from the chamber 42 to atmosphere by way of the aperture 41 in the piston head 39 to passages 48, 49 and 50 in the strut member 44. The rate of this fluid flow is controlled by the metering pin 53 of the screw 51. The orifice as controlled by the metering pin must be of sufficient capacity to permit free venting of fluid in the direction of the movement of the piston element 30 so as to allow the piston to make its full traverse to the position in which the valve 36 seals against the valve seat 37 to cut off further venting of fluid by way of passage 49.

As illustrated in Fig. 1, the axes of the rollers are, when the reservoir pressure is low, to the right of the axis of rotation of the lever members so that the force directed radially inward of the springs 61 against the lever members 54 tends to rotate the lever members in a clockwise direction about the pins 55. This spring force which is transmitted by the lever members to the strut member 44, aids the compression spring 45 in keeping the valve 34 sealed on the valve seat 35 against the reservoir fluid pressure. In this position the surfaces 57 of the lever members 54 diverge toward the left as viewed in Fig. 1. Upon movement of the piston element 30 as above described the lever members 54 are rotated counterclockwise about the pins 55 against the force of the tension springs 61 and due to such movement and the force of the springs 61 the rollers 60 start to travel toward the left along the surfaces 57. Now when the axes of the shafts 59 and rollers 60 pass the plane of the axes of the pins 55 the rollers may be said to have passed dead center. The spring assembly now due to its constricting force rotates the lever members 54 causing the surfaces 57 thereof to converge to the left. The rollers 60 continue to roll along the surfaces 57, the obliquity of which is constantly increasing with movement of the strut member 44, until they are stopped by their engagement with the range adjusting ring 65.

It will be noted that, as the rollers 60 roll away from dead center, the force of the lever members on the strut member 44 rapidly increases, due to the increasing leverage. Although the spring pressure is reduced a small amount by reason of the contraction of the spring assembly, the resulting loss of spring force is outweighed by the rapidly increasing force due to the increasing leverage with a consequent increase of acceleration in the operation of the device.

As the reservoir fluid pressure decreases, its force exerted over the piston area equivalent to the area circumscribed by the valve rib 36 in the piston head 39 is balanced by the force of the compression spring 45 less the effective force of the tension springs 61. When the degree of fluid pressure decrease has become such that the spring 45 may move the strut member 44 and rotate the lever members 54 toward normal position until the slant of the lever surfaces 57 is in the direction as shown in Fig. 1, spring assembly 58 will ride away from the range adjusting ring 65, accelerating the movement of the lever members and thereby the piston element 30 and strut member 44 into normal position.

Fluid in the unloading cylinder 17 will now be vented to atmosphere by way of the aperture 41 in the piston head 39, and passages 48, 49 and 50 in the strut member 44.

The aperture 41 in the piston head 39 must be of sufficient size to permit the free flow of fluid to the valve side of the piston head 39 so as to eliminate interference with piston movement. Also, passage 50 in the strut member 44 must be sufficiently restrictive to fluid flow so as to prevent a premature reduction in fluid pressure on the valve side of piston head 39, or in chamber 42, which would be adverse to rapid piston movement into normal position.

It will be observed that the degree of decrease in reservoir pressure from that point at which unloading of the compressor occurs to that at which loading of the compressor will take place can be determined and controlled by adjustment of the range regulating ring 65. With a greater distance of travel of the spring assembly 58 a greater force will oppose that of the compression spring 45 by reason of the increased leverage of the members 54. Consequently there will be a greater decrease in reservoir pressure before the compressor will become effective. A short range of fluid pressure to change from unloading to loading position may be obtained by screwing the range regulating ring 65 toward spring assembly 58 and a greater range by the opposite adjustment.

Having now described my invention, what I claim as new and desire to secure by Letters Patent, is:

1. A snap acting mechanism comprising a stationary member, a member movable to either one of two control positions, auxiliary means carried by said stationary member adapted to be automatically cut into operation to assist in actuating said movable member after a certain degree of travel by the movable member, in combination, a lever member included in said auxiliary means rockably associated with said stationary member, said lever member having an arm in operative engagement with the movable member and having another arm for actuating the first mentioned arm, a surface on said other arm adapted to be canted upon the rocking of the lever member, and pressure means adapted to traverse said operating surface when it is canted to rapidly increase the actuating force of said lever member.

2. A snap acting mechanism comprising a stationary member, a member movable to either one of two control positions, auxiliary means carried by said stationary member adapted to be automatically cut into operation to assist in actuating said movable member after a certain degree of travel by the movable member, in combination, a lever member included in said auxiliary means rockably associated with said stationary member, said lever member having an arm in operative engagement with the movable member and having another arm for actuating the first mentioned arm, a surface on said other arm adapted to be canted upon the rocking of the lever member, and pressure means acting on said other arm and operative upon a predetermined degree of movement of said lever member by the movable member to rapidly increase the mechanical advantage of the arm.

3. A snap acting mechanism comprising a stationary member, a control element movable to either one of two control positions, auxiliary means carried by said stationary member adapted to be automatically cut into operation to assist in actuating said element after a certain degree of travel by the movable member, in combination, a lever member included in said auxiliary means rockably associated with said stationary member for exerting an actuating force on said element, said lever member being initially rocked by said element, an operating surface on said lever member adapted to be canted upon the initial rocking of the lever member, and pressure means adapted to traverse said operating surface and thereby actuate said lever member to exert a propelling force on said element, and adjustable means for determining the extent of traverse of said means along said surface.

4. A snap acting mechanism of the type comprising a stationary member, a control member movable to either one of two control positions, auxiliary means carried by said stationary member adapted to be automatically cut into operation to assist in actuating said control member after a certain degree of travel by the control member, in combination, a lever member included in said auxiliary means rockably associated with said stationary member, said lever member having an arm in operative engagement with the control member and having another arm for actuating the first mentioned arm, a surface on said other arm adapted to be canted upon the rocking of the lever member, pressure means adapted to traverse said operating surface when it is canted to rapidly increase the actuating force of said lever member, and means adjustable relative to said lever member for determining the extent of traverse of said pressure means along said surface.

5. A snap acting mechanism of the type comprising a stationary member, a control element movable to either one of two control positions, accelerating means carried by said stationary member adapted to be automatically cut into operation to assist in actuating said control element after a certain degree of travel by the control element, in combination, a lever member included in said accelerating means rockably associated with said stationary member, said lever member having an arm in operative engagement with said control element and having another arm for actuating the first mentioned arm, an operating surface on said other arm adapted to be canted upon the rocking of the lever member, pressure means adapted to traverse said operating surface thereby exerting a propelling force on said member which force rapidly increases with the increasing leverage obtained as said pressure means traverses said operating surface, and adjusting means for determining the effective leverage of said lever member by limiting the degree of traverse of said pressure means, said adjusting means being movable relative to said stationary member and to said lever member.

6. A snap acting mechanism of the type comprising a stationary member, a movable member actuable in one direction in response to an increase in power applied thereto and in the opposite direction in response to a decrease in said power, auxiliary means for assisting the movement of said movable member in either direction, in combination, a lever member included in said auxiliary means, said lever member having an arm in operative engagement with the movable member and having another arm for actuating the first mentioned arm, an operating surface on said other arm adapted to be canted upon the rocking of the lever member, pressure means adapted to traverse said operating surface thereby increasing the effective leverage of said pressure means for assisting movement of said movable member as said pressure means traverses said operating surface, and range selecting means adjustable relative to said lever member to determine the degree of decrease in power applied to said movable member upon which said movable member will move in said opposite direction.

7. A snap acting mechanism of the type comprising a stationary member, a control element movable in one direction in response to an increase in pressure thereon and movable in the other direction in response to a decrease in pressure thereon, accelerating means associated with said stationary member and adapted to first oppose the initial movement of said control element in either direction for a certain degree of travel and then to assist said movement, in combination, a lever member included in said accelerating means, said lever member having an arm in operative engagement with said control element and having another arm for actuating the first mentioned arm, an operating surface on said other arm adapted to be canted upon the rocking of the lever member, pressure means adapted to traverse said operating surface to thereby amplify the effective leverage for assisting movement of said control element, and range adjusting means comprising a member carried by said stationary member and movable relative thereto and also to said lever member so as to intercept said pressure means in its travel and limit the leverage which will be effective to oppose the movement of said control element in said opposite direction in response to a decrease in pressure.

GEORGE K. NEWELL.